(12) United States Patent
Mikami

(10) Patent No.: US 7,932,219 B2
(45) Date of Patent: Apr. 26, 2011

(54) GREASE COMPOSITION AND METHOD FOR PRODUCTION THEREOF, AND ROLLING BEARING HAVING THE GREASE COMPOSITION SEALED THEREIN

(75) Inventor: Hidenobu Mikami, Kuwana (JP)

(73) Assignee: NTN Corporation, Osaka (JP)

( * ) Notice: Subject to any disclaimer, the term of this patent is extended or adjusted under 35 U.S.C. 154(b) by 1004 days.

(21) Appl. No.: 10/590,389

(22) PCT Filed: Feb. 28, 2005

(86) PCT No.: PCT/JP2005/003308
§ 371 (c)(1),
(2), (4) Date: Aug. 23, 2006

(87) PCT Pub. No.: WO2005/085400
PCT Pub. Date: Sep. 15, 2005

(65) Prior Publication Data
US 2007/0184990 A1  Aug. 9, 2007

(30) Foreign Application Priority Data
Mar. 4, 2004  (JP) ................................. 2004-061115

(51) Int. Cl.
*C10M 169/06* (2006.01)
*C10M 137/10* (2006.01)
*C10M 135/18* (2006.01)

(52) U.S. Cl. ......... 508/519; 508/368; 508/371; 508/168

(58) Field of Classification Search .................. 508/168, 508/519, 368, 371
See application file for complete search history.

(56) References Cited

U.S. PATENT DOCUMENTS

| | | | | |
|---|---|---|---|---|
| 4,110,233 A | * | 8/1978 | Bailey et al. .................. | 508/521 |
| 5,589,444 A | * | 12/1996 | Hatakeyama .................. | 508/168 |
| 5,604,187 A | * | 2/1997 | Takeuchi et al. .............. | 508/168 |
| 5,952,273 A | * | 9/1999 | Suzuki et al. .................. | 508/168 |
| 6,020,290 A | * | 2/2000 | Takata et al. .................. | 508/364 |

(Continued)

FOREIGN PATENT DOCUMENTS

CN          1357693 A       7/2002

(Continued)

OTHER PUBLICATIONS

International Search Report, Jun. 14, 2005.

*Primary Examiner* — Glenn Caldarola
*Assistant Examiner* — Jim Goloboy
(74) *Attorney, Agent, or Firm* — Hedman & Costigan, P.C.

(57) ABSTRACT

The present invention provides a grease composition which prevents frictional wear of a lubricating surface in a high load-applied state or in a state in which sliding motion is generated and is durable for a long time, a method of manufacturing capable of easily determining an addition ratio of an extreme-pressure agent of the grease composition, and a rolling bearing in which the grease composition is enclosed. A grease composition is composed by adding a thickener and an extreme-pressure agent containing sulfur in a molecular structure thereof to base oil. The extreme-pressure agent is added to the base oil so that a product of an amount (mgS/g) of active sulfur contained in the extreme-pressure agent and an addition amount (wt %) of the extreme-pressure agent with respect to an entire amount of the grease composition is in a range of 3 to 13.

5 Claims, 3 Drawing Sheets

U.S. PATENT DOCUMENTS

| | | | | |
|---|---|---|---|---|
| 6,037,314 | A * | 3/2000 | Kondo et al. | 508/363 |
| 6,258,760 | B1 * | 7/2001 | Ozaki et al. | 508/365 |
| 2005/0261141 | A1 * | 11/2005 | Iso et al. | 508/154 |

FOREIGN PATENT DOCUMENTS

| | | |
|---|---|---|
| JP | 61-012791 | 1/1986 |
| JP | 63-63791 | 3/1988 |
| JP | 03-192196 | 8/1991 |
| JP | 09-255983 | 9/1997 |
| JP | 10-121080 | 5/1998 |
| JP | 10-273691 | 10/1998 |
| JP | 10-273692 | 10/1998 |
| JP | 10-324885 | 12/1998 |
| JP | 11-172276 | 6/1999 |
| JP | 2000-053989 | 2/2000 |
| JP | 2002-3879 | 1/2002 |
| JP | 2002-38177 | 2/2002 |
| JP | 2002-206095 | 7/2002 |
| JP | 2002-235759 A | 8/2002 |
| JP | 2003-342593 | 3/2003 |
| JP | 2003-253287 | 9/2003 |
| JP | 2005-008825 | 1/2005 |
| WO | WO 98/17748 | 4/1998 |
| WO | WO 03/099973 | 4/2003 |

* cited by examiner

GREASE COMPOSITION AND METHOD FOR PRODUCTION THEREOF, AND ROLLING BEARING HAVING THE GREASE COMPOSITION SEALED THEREIN

TECHNICAL FIELD

The present invention relates to grease composition excellent in lubricating properties and in properties of withstanding a high load, a method of manufacturing the grease composition, and a rolling bearing in which the grease composition is filled, and more particularly to a grease composition that can be preferably used for a rolling stock, a building machine, a steel paper-making machine, a car wheel indication part, a constant velocity joint, and the like, a method manufacturing the grease composition; and a rolling bearing in which the grease composition is filled.

BACKGROUND ART

It is known that when the rolling bearing in which grease is enclosed is used in a high load-applied condition, a lubricating film of lubricating grease is liable to fracture. When the lubricating film fractures, metal contact occurs to generate disadvantages of defective lubrication that causes an increase in heat generation and in frictional wear. Therefore by using grease containing an extreme-pressure agent (EP agent), the disadvantages caused by the metal contact is prevented. As substances for preventing the above-described disadvantages, solid lubricant-containing grease (see patent document 1) containing 100 parts by weight of an adduct of melamine (iso) cyanurate and 5 to 1000 parts by weight of a solid lubricant selected from the group of polytetrafluoroethylene, molybdenum disulfide, and molybdenum dithiocarbamate (thereinafter abbreviated as MoDTC) is disclosed (see patent document 1). To decrease wear, a grease composition (see patent document 2) containing molybdenum dithiocarbamate and polysulfide is also disclosed.

When the grease composition is used for the rolling bearing and the constant velocity joint which are used for the rolling stock, the building machine, the steel paper-making machine, the car wheel indication part and the like under high load-applied conditions, the conventional grease composition has a problem that it has an insufficient wear-reducing effect. In severe use conditions, it is necessary to improve the grease composition in lubricating properties and properties of withstanding a high load to prevent the metal contact which occurs owing to the fracture of the lubricating film. In the roller bearing, rolling friction is generated between the rolling surface of the inner ring as well as the rolling surface of the outer ring and a "roller" which is a rolling element and sliding friction is generated between the flange portion and the "roller". Because the degree of the sliding friction is larger than that of the rolling friction, the fracture of lubricating film is liable to occur at the flange portion.

In the ball bearing, sliding occurs between the rolling element and the cage, and further differential sliding occurs between the rolling element and the bearing ring. Thus the lubricating oil film of the lubricating grease is liable to fracture.

In using the extreme-pressure agent containing sulfur in the molecular structure thereof to prevent the fracture of the lubricating film, the metal surface of the bearing is excessively corroded if the addition amount of the extreme-pressure agent is too much, which causes shortening of the life of the bearing. In addition, it is necessary to take much labor of repeating a durability test for each extreme-pressure agent to determine an optimum addition amount. When a plurality of extreme-pressure agents is added to base oil, it is necessary to make a lot of experiments and investigations.

Patent document 1: Japanese Patent Application Laid-Open No. 61-12791 (scope of claims) Patent document 2: Japanese Patent Application Laid-Open No. 10-324885 (paragraph [0005])

DISCLOSURE OF THE INVENTION

Problem to be Solved by the Invention

The present invention has been made to cope with the above-described problem. It is an object of the present invention to provide a grease composition which prevents frictional wear of a lubricating surface in a high load-applied state or in a state in which sliding motion is generated and is durable for a long time, a method of manufacturing capable of easily determining an addition ratio of an extreme-pressure agent of the grease composition, and a rolling bearing in which the grease composition is enclosed.

Means for Solving the Problem

A grease composition of the present invention comprises a base oil, a thickener and an extreme-pressure agent containing sulfur in a molecular structure thereof. The extreme-pressure agent is added to the base oil so that a product of an amount (mgS/g) of active sulfur contained in the extreme-pressure agent and an addition amount (wt %) of the extreme-pressure agent with respect to an entire amount of the grease composition is in a range of 3 to 13.

Not less than two kinds of the extreme-pressure agent are added to the base oil. A product of an amount (mgS/g) of active sulfur contained in each of the extreme-pressure agents and an addition amount (wt %) of each of the extreme-pressure agents with respect to an entire amount of the grease composition is found. The extreme-pressure agents are added to the base oil so that a sum of the products computed for all of the extreme-pressure agents is in a range of 3 to 13.

The thickener is a urea compound.

The amount (mgS/g) of the active sulfur is a value obtained by the following method as a scale indicating the degree of reactivity of the extreme-pressure agent containing sulfur in the molecular structure thereof with a metal surface.

0.5 g of copper powder (produced by KANTO CHEMICAL CO., INC., particle diameter: 75 to 150 μm), 4.75 g of mineral oil (100 cSt, 40° C., "Super Oil N100" produced by NIPPON OIL CORPORATION), and 0.25 g of the extreme-pressure agent containing sulfur in the molecular structure thereof were put in a test tube and dissolved. Then they were stirred at 150° C. in the air for four hours. The concentration (wt %) of the sulfur before and after the test is measured with fluorescent X-ray analysis, and the amount the active sulfur is computed from the following equation (1). That is, the amount the active sulfur is a value determined in dependence on the kind of copper powder and mineral oil and is different according to the extreme-pressure agent.

[Equation (1)]

$$\text{Amount of active sulfur} = (x/100 - y/100) \times 1000 \, (\text{mgS/g}) \quad (1)$$

where x indicates the concentration of sulfur (wt %) in lubricating oil in which the extreme-pressure agent is dissolved and is a value measured at 150° C. before stirring, and y indicates the concentration of the sulfur (wt %) in the lubricating oil in which the extreme-pressure agent is dissolved and is a value measured at 150° C. after stirring for four hours.

As shown in the equation (1), the amount (mgS/g) of the active sulfur of the present invention indicates the amount (mg) of the sulfur, contained in 1 g of the lubricating oil, which has reacted with the copper powder. Thus as the value of the amount (mgS/g) of the active sulfur becomes larger, the sulfur increasingly reacts with the metal surface. That is, it can be said that the extreme-pressure agent having a large amount of the active sulfur is highly reactive.

To preferably use the grease composition for a rolling bearing that is used in a high load-applied condition, it is necessary to repeat a durability test to determine an optimum addition amount of the extreme-pressure agent when the grease composition is manufactured by adding the extreme-pressure agent containing the sulfur in the molecular structure thereof to the base oil. The extreme-pressure agent containing the sulfur in the molecular structure thereof is considered to form a thin sulfide layer on the metal surface of the bearing, there by holding lubricating performance. Of the sulfur contained in the extreme-pressure agent, apart of the sulfur reacts with the metal surface to form the sulfide layer. The reactivity of the extreme-pressure agent is different according to the molecular structure thereof. Therefore the addition amount of the extreme-pressure agent having a high reactivity is considered to be necessarily small, whereas the addition amount of the extreme-pressure agent having a low reactivity is considered to be necessarily large.

The present invention has been made based on the above-described finding. As the scale indicating the degree of the reactivity of the sulfur contained in the extreme-pressure agent, the amount of the active sulfur is computed based on the above-described measuring method. Thereafter the addition amount of the extreme-pressure agent is determined in such a manner that the product of the amount of the active sulfur and the addition amount of the extreme-pressure agent is constant within a range in which the obtained grease composition has a sufficient lubricating performance in a high load-applied condition.

The product of the amount (mgS/g) of the active sulfur and the addition amount (wt %) has a unit (mgS/g·wt %). In the present invention, the product is regarded as one index for determining the addition amount of the extreme-pressure agent, and the indication of the unit is omitted.

By finding the product of the amount of the active sulfur and the addition amount as described above, it is possible to evaluate the grease composition containing the extreme-pressure agent containing the sulfur in its molecular structure.

A method of the present invention for manufacturing a grease composition includes a step of adding a thickener and an extreme-pressure agent containing sulfur in a molecular structure thereof to base oil. The extreme-pressure agent is added to the base oil so that a product of an amount (mgS/g) of active sulfur contained in the extreme-pressure agent and an addition amount (wt %) of the extreme-pressure agent with respect to an entire amount of the grease composition is in a range of 3 to 13.

In a rolling bearing of the present invention in which the grease composition is filled, the above-described grease composition is enclosed in a sliding portion thereof.

Effect of the Invention

In the grease composition of the present invention, the extreme-pressure agent containing the sulfur in the molecular structure thereof is added to the base oil so that that the product of the amount (mgS/g) of the active sulfur contained in the extreme-pressure agent and the addition amount (wt %) of the extreme-pressure agent with respect to the entire amount of the grease composition is in the range of 3 to 13. Therefore the grease composition is excellent in the wear resistance and durability thereof. Further the addition amount of the extreme-pressure agent can be determined in relation to the amount of the active sulfur. Thus when a new additive is used, it is possible to reduce the trouble of conducting trial-and-error experiments about the addition amount thereof.

When not less than two kinds of the extreme-pressure agents are added to the base oil, the product of the amount (mgS/g) of active sulfur contained in each of the extreme-pressure agents and the addition amount (wt %) of each of the extreme-pressure agents with respect to the entire amount of the grease composition is found. The addition amount of each extreme-pressure agent can be determined so that the sum of the products computed for all of the extreme-pressure agents is in the range of 3 to 13. Thus it is easy to design for the production of the grease composition.

In the method of the present invention for manufacturing the grease composition, the extreme-pressure agent containing the sulfur in the molecular structure thereof is added to the base oil so that that the product of the amount (mgS/g) of the active sulfur contained in the extreme-pressure agent and the addition amount (wt %) of the extreme-pressure agent with respect to the entire amount of the grease composition is in the range of 3 to 13. Therefore the grease composition is excellent in the wear resistance and durability thereof.

In the rolling bearing of the present invention in which the grease composition is filled, the above-described grease composition is enclosed in the sliding portion thereof. Therefore the grease composition is excellent in the wear resistance and durability thereof and can be preferably used in a high load-applied condition.

EXPLANATION OF REFERENCE NUMERALS AND SYMBOLS

Figure 1:
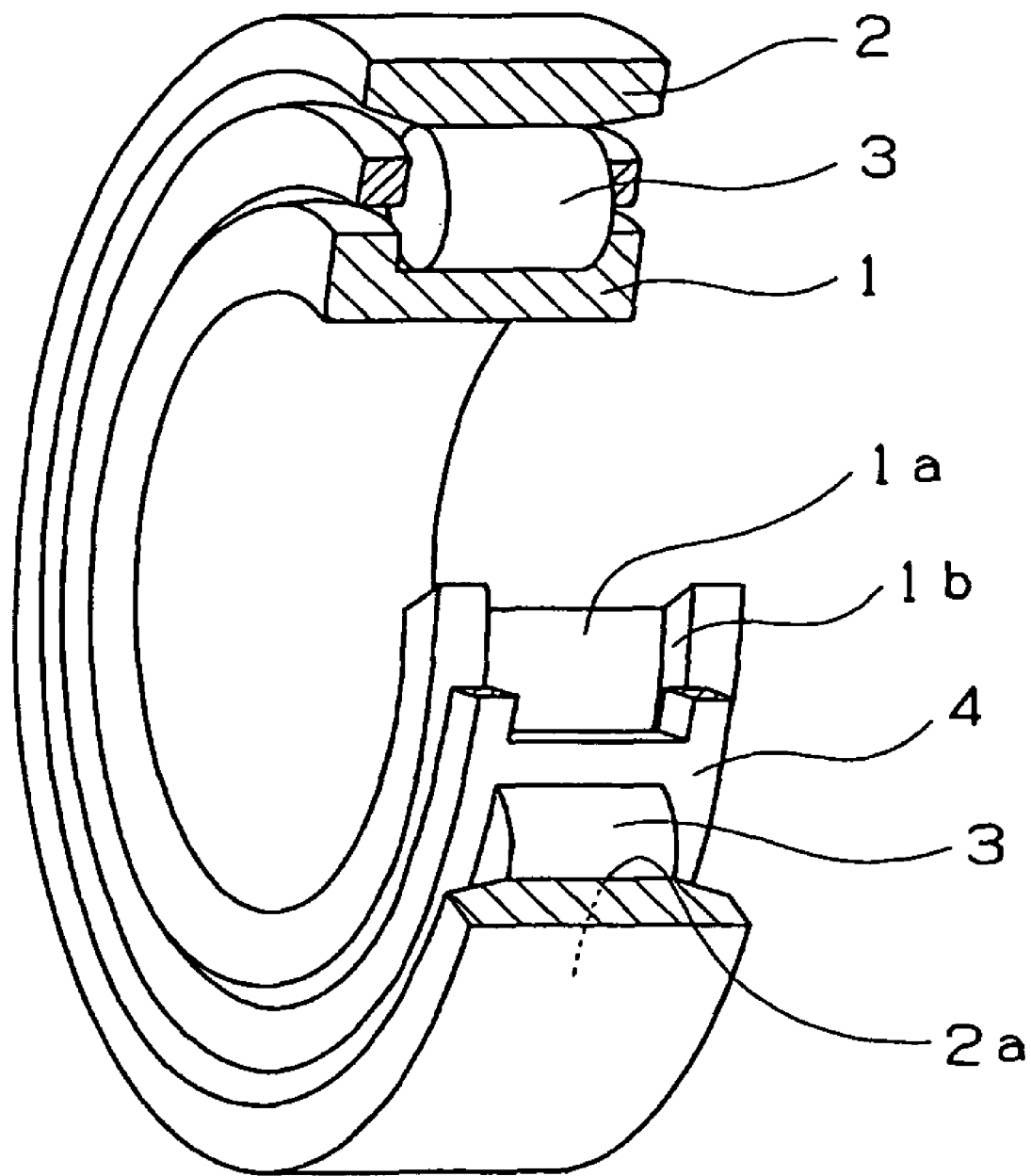
FIG. 1 is a partly cut-out perspective view of a roller bearing.

1: inner ring
2: outer ring
3: roller
4: cage
5: rotational shaft
6, 7: ring-shaped specimen
8: end surface

BEST MODE FOR CARRYING OUT THE INVENTION

The grease composition of the present invention is obtained by adding a thickener and an extreme-pressure agent containing sulfur in a molecular structure thereof to base oil in such a way that a product of an amount (mgS/g) of active sulfur contained in the extreme-pressure agent and an addition amount (wt %) of the extreme-pressure agent with respect to an entire amount of the grease composition is in the range of 3 to 13. Therefore it is possible to arbitrarily select the kind of the extreme-pressure agent and the addition amount thereof, provided that the product of the amount (mgS/g) of the active sulfur contained in the extreme-pressure agent and the addition amount (wt %) of the extreme-pressure agent is in the range of 3 to 13.

Not less than two kinds of the extreme-pressure agent may be added to the base oil. In this case, a product of an amount (mgS/g) of active sulfur contained in each of the extreme-pressure agents and an addition amount (wt %) of each of the extreme-pressure agents with respect to an entire amount of the grease composition is found. The extreme-pressure agents are added to the base oil in such a way that a sum of the products computed for all of the extreme-pressure agents is in the range of 3 to 13.

As the extreme-pressure agent, containing the sulfur in the molecular structure thereof, which can be used in the present invention, sulfurized grease, sulfurized olefin, sulfurized ester, molybdenum dithiocarbamate, zinc dithiocarbamate, zinc dithiophosphate, and molybdenum dithiophosphate, and mixtures of not less than two kinds of these extreme-pressure agents are listed. When poly-α-olefin oil is used as the base oil of the present invention which will be described later, it is especially preferable to use the sulfurized grease, sulfurized olefin, the molybdenum dithiocarbamate, and the zinc dithiocarbamate because these extreme-pressure agents are excellent in the solubility in the base oil.

As the sulfurized grease, sulfurized lard, sulfurized rape oil, sulfurized castor oil, sulfurized soy bean oil, sulfurized rice bran oil are listed. As products commercially available, "Lubrizol Lz5346" (commercial name, produced by Lubrizol Corporation) and "Lubrizol Lz5006" (commercial name, produced by Lubrizol Corporation) are listed.

As the sulfurized olefin, propylene, isobutene, diisobutene are listed. As products commercially available, "Anglamol 33" (commercial name, produced by Lubrizol Corporation) and "Anglamol 3310" (commercial name, produced by Lubrizol Corporation) are listed.

As the molybdenum dithiocarbamate commercially available, "Molyvan 822" (commercial name, produced by Vanderbuilt Company, Inc.) can be used. As the zinc dithiocarbamate commercially available, "VanlubeAZ" (commercial name, produced by Vanderbuilt Company, Inc.) can be used.

As the base oil that can be used for the grease composition of the present invention, mineral oil, poly-α-olefin oil, ester oil, phenyl ether oil, fluorine oil, and hydrocarbon oil (GTL base oil) synthesized by Fischer-Tropsch reaction are listed. Of these oils, it is preferable to use at least one base oil selected from among the poly-α-olefin oil and the mineral oil. Normally the above-described poly-α-olefin oil is oligomers of α-olefin or isomerized α-olefin or mixtures of polymers. As examples of the α-olefin, it is possible to list 1-octane, 1-nonen, 1-decene, dodecene, 1-tridecene, 1-tetradecene, 1-pentadecene, 1-hexadecene, 1-heptadecene, 1-octadecene, 1-nonadecene, 1-eicosene, 1-docosene, and 1-tetracosene. Normally mixtures of these substances are used. As the mineral oil, it is possible to use any of lubricants such as paraffin mineral oil, naphthene mineral oil, and the like and those used in the decomposition of grease.

It is preferable that the base oil that is used in the present invention has a kinematic viscosity of 30 to 200 mm$^2$/s at 40° C. It is not preferable that the base oil has a kinematic viscosity less than 30 mm$^2$/s because the evaporation loss thereof increases and the resistance thereof to heat deteriorates. It is not preferable that the kinematic viscosity of the base oil exceeds 200 mm$^2$/s, because the temperature of the bearing rises greatly owing to an increase of the rotational torque.

As the thickener that can be used for the grease of the present invention, it is possible to use metallic soap-based thickener such as aluminum soap, lithium soap, sodium soap, composite lithium soap, composite calcium soap, composite aluminum soap, and the like; and a urea compound such as a diurea compound and a polyurea compounds. Considering heat resistance, the urea compound is preferable. The diurea compound shown by a formula (2) shown below is especially preferable. These thickeners may be used singly or in combination of two kinds or more.

[Chemical formula 1]

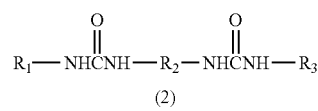

(2)

($R_2$ in the formula (1) indicates a bivalent aromatic hydrocarbon group having 6 to 15 carbon atoms. $R_1$ and $R_3$ indicate an aromatic hydrocarbon group having 6 to 12 carbon atoms, an alicyclic hydrocarbon group having carbon 6 to 20 atoms or an aliphatic hydrocarbon group having carbon 6 to 20 atoms. $R_1$ and $R_3$ may be identical to or different from each other.)

If the number of carbon atoms of $R_2$ is less than the above-described range, the thickening property of the grease is inferior. On the other hand, if the number of carbon atoms of $R_2$ is more than the above-described range, the grease composition is liable to harden. As $R_2$, groups composed of aromatic monocyclic rings or aromatic polycyclic rings connected with each other with a methylene group, a cyanuric ring group or an isocyanuric ring group are listed.

If the number of carbon atoms of $R_1$ and $R_3$ is less than the above-described range, the heat-resistant property of the grease composition is inferior. If the number of carbon atoms of $R_1$ and $R_3$ is more than the above-described range, the thickening property of the grease composition is inferior. As the aromatic hydrocarbon group indicated by $R_1$ and $R_3$, phenyl group, triyl group, xylyl group, t-butylphenyl group, and benzyl group are listed. As the alicyclic hydrocarbon group, cyclohexyl group, methylcyclohexyl group, and dimethylcyclohexyl group are listed. As the aliphatic hydrocarbon group, straight-chain alkylamino compounds are preferable. For example, n-docosylamine, n-octylamine, n-icosylamine are listed.

The mixing ratio of the urea compound is set to 5 to 30 wt % with respect to the entire grease composition. If the mixing ratio of the urea compound is less than 5 wt %, the thickening effect is reduced, and greasing is difficult. On the other hand, if the mixing ratio of the urea compound is more than 30 wt %, it is difficult to obtain the desired effect.

The grease composition of the present invention may contain known additives other than the extreme-pressure agent as necessary. As the additive agents, it is possible to list antioxidants such as amine-based antioxidant, phenol-based antioxidant; metal inert agents such as benzotriazole, sodium nitride, and the like; viscosity index-improving agents such as polymethacrylate, polystyrene, and the like; and solid lubricants such as molybdenum disulfide, graphite, and the like. These additive agents can be added to the base oil singly or in combination of two kinds or more thereof.

A roller bearing in which the grease composition manufactured by the manufacturing method of the present invention is enclosed is described below with reference to FIG. 1. FIG. 1 is a partly cut-out perspective view of the roller bearing. In the roller bearing, a roller 3 is disposed between an inner ring 1 and an outer ring 2 via a cage 4. The roller 3 is subjected to rolling friction between a rolling surface 1a of the inner ring 1 and a rolling surface 2a of the outer ring 2 and sliding friction between flange portions 1b of the inner ring 1. To reduce the rolling friction and the sliding friction, the grease composition of the present invention is enclosed therein.

EXAMPLES

Examples 1 through 10, Comparison Examples 1 through 4

As the sulfur-containing extreme-pressure agent, the amount (mgS/g) of active sulfur of each of sulfurized grease, sulfurized olefin, molybdenum dithiocarbamate, zinc dithiocarbamate was found based on the equation (1). Table 1 shows the results. Table 1 also shows the range of the addition amount (wt %) of each extreme-pressure agent which allows the product of the amount (mgS/g) of the active sulfur and the addition amount (wt %) of the extreme-pressure agent to be in the range of 3 to 13.

In each of examples 1 through 6 and comparison examples 1 through 4, the comparison example 1 through 4, a grease composition was prepared on an experimental basis by adding the above-described extreme-pressure agents to the lithium soap/mineral oil-based grease (kinematic viscosity: 100 mm$^2$/s at 40° C., mixing consistency: 220) at the ratios shown in table 2.

In each of examples 7 and 8, a grease composition was prepared on an experimental basis by adding the extreme-pressure agents at the ratios shown in table 2 to urea/PAO grease A obtained by reacting 60.6 g of 4,4'-diphenylmethane diisocyanate, 31.3 g of octylamine, and 66.2 g of stearilamine with each other in 2000 g of the poly-α-olefin (SYNFLUID 801 produced by Nippon Steel Chemical Co., Ltd.: kinematic viscosity: 46 mm$^2$/s at 40° C.)

In each of examples 9 and 10, a grease composition was prepared on an experimental basis by adding the extreme-pressure agents at the ratios shown in table 2 to urea/PAO grease B obtained by reacting 200.8 g of 4,4'-diphenylmethane diisocyanate and 159.2 g of cyclohexylamine with each other in 1640 g of the poly-α-olefin (SYNFLUID 801 produced by Nippon Steel Chemical Co., Ltd.: kinematic viscosity: 46 mm$^2$/s at 40° C.).

In each of the examples, the product of the amount (mgS/g) of the active sulfur and the addition amount (wt %) fell within the range shown in table 1, whereas in the comparison examples, the product did not fall within the range.

An extreme-pressure property evaluation test and a test of a roller bearing were conducted on the obtained grease compositions. Table 2 shows the results.

Extreme-Pressure Property Evaluation Test

Figure 2:
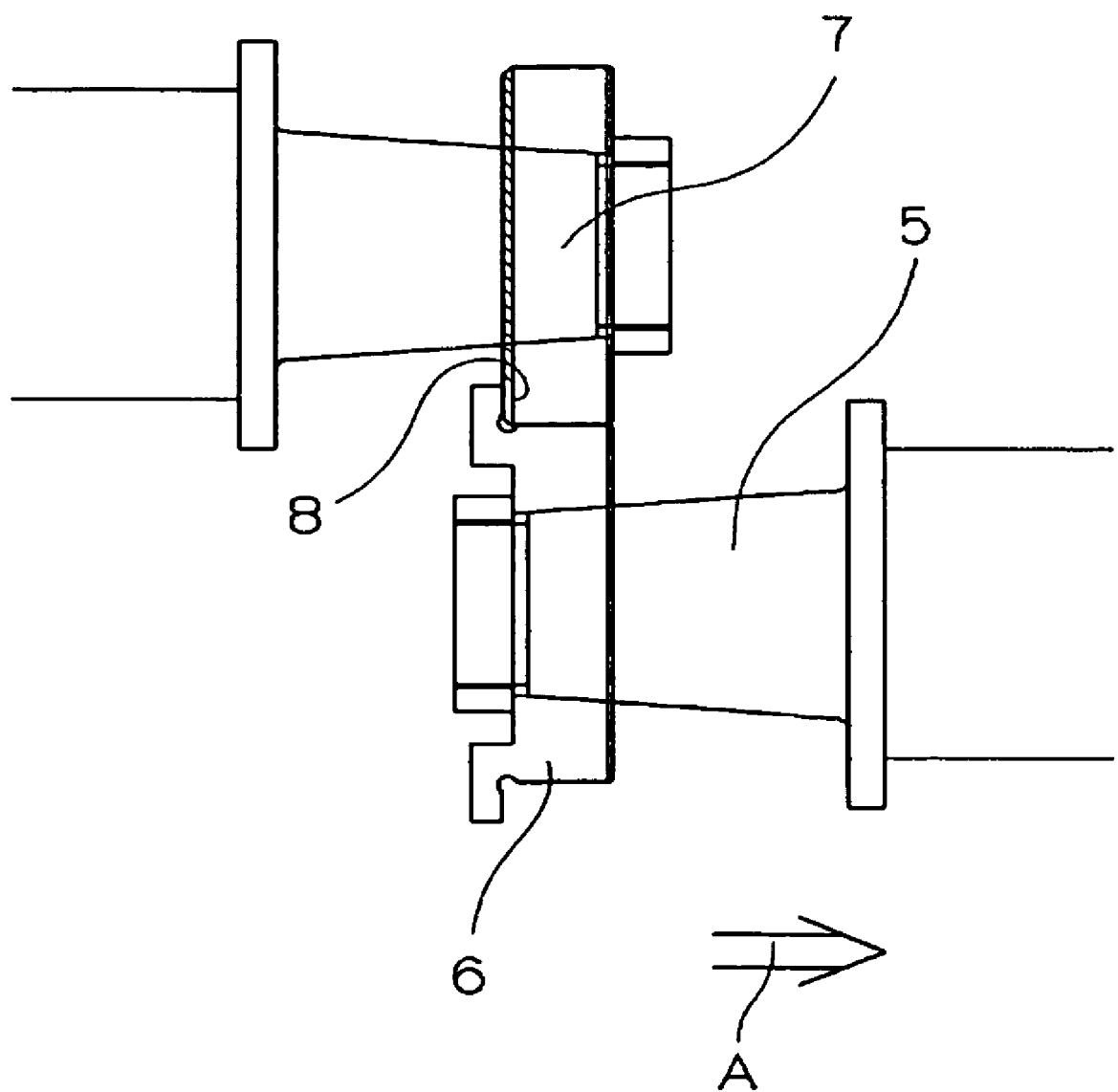
FIG. 2 shows an extreme-pressure property evaluation test apparatus.

An extreme-pressure property evaluation test apparatus is shown in FIG. 2. An evaluation test apparatus is constructed of a ring-shaped specimen 6 of φ40×10 fixed to a rotational shaft 5 and a ring-shaped specimen 7 whose end surface is rubbed with an end surface 8 of the specimen 6. The grease composition was applied to the end surface 8. The extreme-pressure property was evaluated by rotating the rotational shaft 5 at 2000 rpm and setting an axial load to 490 N in the direction A in FIG. 2 and a radial load to 392 N. The extreme-pressure property was evaluated by measuring vibrations of the rotational shaft 5 by a vibration sensor. The test was conducted until the vibration value of the rotational shaft became twice as large as an initial value thereof. The period of time it took for the vibration value thereof to become twice as large as the initial value thereof was measured.

Test of Roller Bearing 3.6 g of grease was enclosed in each of 30206 tapered roller bearings, and the evaluation test apparatus was operated at an axial load of 980 N, 2600 rpm, and a room temperature to measure the temperature of the surface of the flange portion during the rotation thereof. An average value of the temperature of the surface of the flange portion was computed in four to eight hours after the operation of the evaluation test apparatus started.

TABLE 1

|  | A: Amount of active sulfur (mgS/g) | B: Range of addition amount (wt %) | A × B |
|---|---|---|---|
| Sulfurized grease[1] | 0.8 | 3.75-16.25 | 3-13 |
| Sulfurized olefin[2] | 2.8 | 1.07-4.64 | 3-13 |
| MoDTC[3] | 2.6 | 1.15-5 | 3-13 |
| ZnDTC[4] | 1.9 | 1.57-6.85 | 3-13 |

[1]Lubrizol Lz5346 (produced by Lubrizol Corporation)
[2]Anglamol 33 (produced by Lubrizol Corporation)
[3]Molyvan 822 (produced by Vanderbilt Company, Inc.)
[4]Vanlube AZ (produced by Vanderbilt Company, Inc.)

TABLE 2

|  | Example | | | | | | | | | | Comparison Example | | | |
|---|---|---|---|---|---|---|---|---|---|---|---|---|---|---|
|  | 1 | 2 | 3 | 4 | 5 | 6 | 7 | 8 | 9 | 10 | 1 | 2 | 3 | 4 |
| Mixing (wt %) | | | | | | | | | | | | | | |
| Grease | | | | | | | | | | | | | | |
| Li/mineral oil-based grease | 95 | 97 | 95 | 95 | 97.5 | 95 | — | — | — | — | 100 | 95 | 95 | 97.5 |
| Urea/PAO grease A | — | — | — | — | — | — | 95 | 95 | — | — | — | — | — | — |
| Urea/PAO grease B | — | — | — | — | — | — | — | — | 95 | 95 | — | — | — | — |
| Extreme-pressure agent | | | | | | | | | | | | | | |
| Sulfurized grease[1] | 5 | — | — | — | — | 2.5 | 5 | — | 5 | — | — | — | — | 2.5 |
| Sulfurized olefin[2] | — | 3 | — | — | — | — | — | — | — | — | — | 5 | — | — |
| MoDTC[3] | — | — | 5 | — | — | — | — | — | — | — | — | — | — | — |
| ZnDTC[4] | — | — | — | 5 | 2.5 | 2.5 | — | 5 | — | 5 | — | — | — | — |
| ZnDTP[5] | — | — | — | — | — | — | — | — | — | — | — | — | 5 | — |

TABLE 2-continued

|  | Example | | | | | | | | | | Comparison Example | | | |
| --- | --- | --- | --- | --- | --- | --- | --- | --- | --- | --- | --- | --- | --- | --- |
|  | 1 | 2 | 3 | 4 | 5 | 6 | 7 | 8 | 9 | 10 | 1 | 2 | 3 | 4 |
| Amount of active sulfur (mgS/g) × addition amount (wt %) Characteristics | 4 | 8.4 | 13 | 9.5 | 4.75 | 7 | 4 | 9.5 | 4 | 9.5 | 0 | 14 | 0.5 | 2 |
| Extreme-pressure property evaluation test(hour) | 92 | 99 | 62 | 59 | 62 | 67 | 145 | 165 | 185 | 200 | 16 | 33 | 40 | 34 |
| Roller bearing test(° C.) | 64 | 64 | 68 | 66 | 68 | 66 | 62 | 60 | 62 | 58 | 85 | 79 | 82 | 74 |

[1)]Lubrizol Lz5346 (produced by Lubrizol Corporation)
[2)]Anglamol 33 (produced by Lubrizol Corporation)
[3)]Molyvan 822 (produced by Vanderbilt Company, Inc.)
[4)]Vanlube AZ (produced by Vanderbilt Company, Inc.)
[5)]Lubrizol Lz1097 (produced by Lubrizol Corporation)

Figure 3:
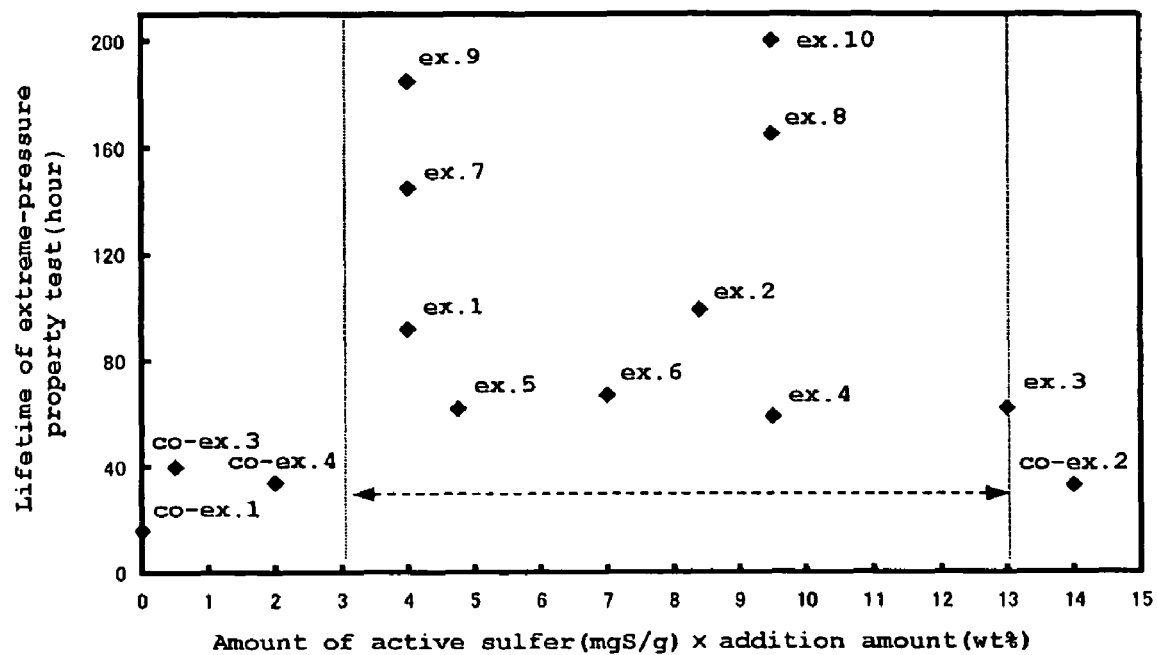
FIG. 3 shows the relationship between a product of the amount of active sulfur contained in an extreme-pressure agent and an addition amount of the extreme-pressure agent and a lifetime in an extreme-pressure property evaluation test.

Regarding the examples 1 through 10 and comparison examples 1 through 4, FIG. 3 shows the relationship between the product of the amount (mgS/g) of the active sulfur and the addition amount (wt %) and the lifetime in the extreme-pressure property evaluation test. In FIG. 3, the axis of the abscissa shows the product of the amount (mgS/g) of the active sulfur and the addition amount (wt %), and the axis of ordinates shows a lifetime (hour) in the extreme-pressure property evaluation test.

As shown in table 2 and FIG. 3, the grease composition obtained by adding the sulfur-containing extreme-pressure agent to the base oil so that that the product of the amount (mgS/g) of the active sulfur contained in the extreme-pressure agent and the addition amount (wt %) of the extreme-pressure agent was in the range of 3 to 13. Therefore the grease composition had improved wear resistance. As shown in FIG. 3, when the amount (mgS/g) of the active sulfur contained in the extreme-pressure agent and the addition amount (wt %) of the extreme-pressure agent is in the range of 4 to 10, the grease compositions have a long life and are hence preferable.

The grease composition enclosed in the bearing of each of the examples was obtained by adding the sulfur-containing extreme-pressure agent to the base oil so that that the product of the amount (mgS/g) of the active sulfur contained in the extreme-pressure agent and the addition amount (wt %) thereof was in the range of 3 to 13. Therefore heat was generated to a low extent on the flange portion of each bearing, and metal contact of the sliding portion thereof was prevented. Therefore the bearing of each of the examples is durable.

INDUSTRIAL APPLICABILITY

The grease composition of the present invention is superior in the wear resistance, durable, and can be preferably used in a high load-applied condition. Therefore the grease composition of the present invention can be enclosed in roller bearings such as a cylindrical roller bearing, a tapered roller bearing, a self-aligning roller bearing, a needle-shaped roller bearing, a thrust cylindrical roller bearing, a thrust tapered roller bearing, a thrust needle-shaped roller bearing, a thrust self-aligning roller bearing, and a ball bearing.

The invention claimed is:

1. A grease composition consisting of a base oil, a thickener and an extreme-pressure agent containing sulfur in a molecular structure thereof, wherein said extreme-pressure agent is added to said base oil so that a product of an amount (mgS/g) of active sulfur contained in said extreme-pressure agent and an addition amount (wt %) of said extreme-pressure agent with respect to an entire amount of said grease composition is in a range of 3 to 13,
   wherein said base oil is mineral oil, said thickener is lithium soap, and said extreme-pressure agent is at least one extreme-pressure agent selected from among sulfurized grease, sulfurized olefin, ester sulfide, molybdenum dithiocarbamate, zinc dithiocarbamate, zinc dithiophosphate, and molybdenum dithiophosphate.

2. The grease composition according to claim 1, wherein not less than two kinds of said extreme-pressure agents are added to said base oil; a product of an amount (mgS/g) of active sulfur contained in each of said extreme-pressure agents and an addition amount (wt %) of each of said extreme-pressure agents with respect to an entire amount of said grease composition is found; and said extreme-pressure agents are added to said base oil so that a sum of said products computed for all of said extreme-pressure agents is in a range of 3 to 13.

3. A method of manufacturing a grease composition consisting of a base oil, a thickener and an extreme-pressure agent containing sulfur in a molecular structure thereof, comprising
   a step of adding said thickener and said extreme-pressure agent containing sulfur in a molecular structure thereof to said base oil,
   wherein said extreme-pressure agent is added to said base oil so that a product of an amount (mgS/g) of active sulfur contained in said extreme-pressure agent and an addition amount (wt %) of said extreme-pressure agent with respect to an entire amount of said grease composition is in a range of 3 to 13, and
   wherein said base oil is mineral oil, said thickener is lithium soap, and said extreme-pressure agent is at least one extreme-pressure agent selected from among sulfurized grease, sulfurized olefin, ester sulfide, molybdenum dithiocarbamate, zinc dithiocarbamate, zinc dithiophosphate, and molybdenum dithiophosphate.

4. A rolling bearing comprising an inner ring; an outer ring; a plurality of rolling elements interposed between said inner ring and said outer ring; and a grease composition enclosed in a periphery of said rolling elements, wherein said grease composition is a grease composition according to claim 1 or 2.

5. The rolling bearing according to claim 4, wherein said rolling bearing is a ball bearing.

* * * * *